(12) United States Patent
Lozier (10) Patent No.: US 9,649,519 B2
(45) Date of Patent: *May 16, 2017

(54) FIREFIGHTING DEVICE FEEDBACK CONTROL

(75) Inventor: Todd Brian Lozier, Elkhart, IN (US)

(73) Assignee: Elkhart Brass Manufacturing Company, Inc., Elkhart, IN (US)

( * ) Notice: Subject to any disclaimer, the term of this patent is extended or adjusted under 35 U.S.C. 154(b) by 475 days.

This patent is subject to a terminal disclaimer.

(21) Appl. No.: 13/585,129

(22) Filed: Aug. 14, 2012

(65) Prior Publication Data

US 2012/0305273 A1    Dec. 6, 2012

Related U.S. Application Data

(63) Continuation of application No. 12/174,866, filed on Jul. 17, 2008, now Pat. No. 8,245,790.

(Continued)

(51) Int. Cl.
  *A62C 27/00*   (2006.01)
  *A62C 31/28*   (2006.01)
  (Continued)

(52) U.S. Cl.
  CPC ............ *A62C 31/28* (2013.01); *A01M 7/005* (2013.01); *A01M 7/0075* (2013.01); *A62C 3/00* (2013.01);
  (Continued)

(58) Field of Classification Search
  CPC ....... A62C 31/28; A62C 99/009; A62C 27/00; A62C 3/00; A62C 31/22; A62C 31/02; A01M 7/05; A01M 7/0075; B05B 15/066
  (Continued)

(56) References Cited

U.S. PATENT DOCUMENTS

| 3,786,869 A | 1/1974 | McLoughlin |
| 3,943,312 A | 3/1976 | Bernstein et al. |

(Continued)

FOREIGN PATENT DOCUMENTS

| JP | 04138176 A | 5/1992 |
| JP | 04138176A A | 5/1992 |

(Continued)

OTHER PUBLICATIONS

Search report dated Dec. 9, 2008 for corresponding PCT International Application No. PCT/US2008/070293.

(Continued)

*Primary Examiner* — Steven J Ganey
(74) *Attorney, Agent, or Firm* — Faegre Baker Daniels LLP (57) ABSTRACT

A control system for a fire fighting component includes a detector for detecting a position of at least a portion of a fire fighting component relative to an axis, which generates an output position signal indicative of the position of the at least a portion of the fire fighting component, and a controller in communication with the detector and receiving the output position signal. The controller generates a display output signal based on the output position signal. The system further includes a display that is in communication with the controller and receives the display output signal. The display generates an icon that is a graphical representation of the fire fighting device, and configures the icon based on the output display signal wherein the configuration of the icon indicates the position of the at least a portion of the fire fighting device.

20 Claims, 9 Drawing Sheets

Related U.S. Application Data (60) Provisional application No. 60/950,137, filed on Jul. 17, 2007.

(51) Int. Cl.
    *A62C 3/00* (2006.01)
    *A62C 31/22* (2006.01)
    *A62C 31/02* (2006.01)
    *A01M 7/00* (2006.01)
    *B05B 15/06* (2006.01)
    *A62C 99/00* (2010.01)

(52) U.S. Cl.
    CPC .............. *A62C 27/00* (2013.01); *A62C 31/02* (2013.01); *A62C 31/22* (2013.01); *B05B 15/066* (2013.01); *A62C 99/009* (2013.01)

(58) Field of Classification Search
    USPC ............... 169/24, 25, 43, 46, 52, 54, 56, 70; 239/69, 159, 160, 164, 166, 587.1–587.3; 700/283; 701/22, 50; 285/277, 912, 920
    See application file for complete search history.

(56) References Cited

U.S. PATENT DOCUMENTS

| | | | |
|---|---|---|---|
| 3,974,879 A | 8/1976 | Nelson, Jr. et al. | |
| 3,981,618 A | 9/1976 | Nelson, Jr. | |
| 4,189,005 A | 2/1980 | McLoughlin | |
| 4,593,855 A | 6/1986 | Forsyth | |
| 4,949,794 A | 8/1990 | Petit et al. | |
| 5,044,445 A | 9/1991 | Kayahara | |
| 5,223,822 A | 6/1993 | Stommes et al. | |
| 5,411,100 A | 5/1995 | Laskaris et al. | |
| 5,579,800 A | 12/1996 | Walker | |
| 5,727,933 A | 3/1998 | Laskaris et al. | |
| 5,899,276 A | 5/1999 | Relyea et al. | |
| 5,979,564 A | 11/1999 | Crabtree | |
| 6,343,615 B1 | 2/2002 | Miller et al. | |
| 6,421,593 B1 | 7/2002 | Kempen et al. | |
| 6,547,528 B1 | 4/2003 | Yoshida | |
| 6,553,290 B1 | 4/2003 | Pillar | |
| 6,651,900 B1 | 11/2003 | Yoshida | |
| 6,725,940 B1 | 4/2004 | Klein | |
| 6,757,597 B2 | 6/2004 | Yakes et al. | |
| 6,766,863 B2 | 7/2004 | Arvidson et al. | |
| 6,772,845 B1 | 8/2004 | Janson | |
| 6,882,917 B2 | 4/2005 | Pillar et al. | |
| 6,885,920 B2 * | 4/2005 | Yakes et al. .................... 701/22 |
| 6,886,639 B2 | 5/2005 | Arvidson et al. | |
| 6,909,944 B2 | 6/2005 | Pillar et al. | |
| 6,922,615 B2 * | 7/2005 | Pillar et al. ...................... 169/24 |
| 6,991,041 B2 | 1/2006 | Laskaris et al. | |
| 6,993,421 B2 | 1/2006 | Pillar et al. | |
| 6,994,282 B2 | 2/2006 | Trapp et al. | |
| 7,006,902 B2 | 2/2006 | Archer et al. | |
| 7,024,296 B2 | 4/2006 | Squires | |
| 7,072,745 B2 | 7/2006 | Pillar et al. | |
| 7,107,129 B2 | 9/2006 | Rowe et al. | |
| 7,127,331 B2 | 10/2006 | Pillar et al. | |
| 7,162,332 B2 | 1/2007 | Pillar et al. | |
| 7,164,977 B2 | 1/2007 | Yakes et al. | |
| 7,184,862 B2 | 2/2007 | Pillar et al. | |
| 7,184,866 B2 | 2/2007 | Squires et al. | |
| 7,191,964 B2 | 3/2007 | Trapp | |
| 7,234,534 B2 | 6/2007 | Froland et al. | |
| 7,243,864 B2 | 7/2007 | Trapp et al. | |
| 7,254,468 B2 | 8/2007 | Pillar et al. | |
| 7,274,976 B2 | 9/2007 | Rowe et al. | |
| 7,277,782 B2 | 10/2007 | Yakes et al. | |
| 7,302,320 B2 | 11/2007 | Nasr et al. | |
| 7,318,483 B2 | 1/2008 | Arvidson et al. | |
| 7,379,797 B2 | 5/2008 | Nasr et al. | |
| 7,389,826 B2 | 6/2008 | Linsmeier et al. | |
| 7,392,122 B2 | 6/2008 | Pillar et al. | |
| 7,412,307 B2 | 8/2008 | Pillar et al. | |
| 7,451,028 B2 | 11/2008 | Pillar et al. | |
| 7,522,979 B2 | 4/2009 | Pillar | |
| 7,555,369 B2 | 6/2009 | Pillar | |
| 7,571,662 B2 | 8/2009 | Pickering et al. | |
| 7,614,455 B2 | 11/2009 | Arvidson et al. | |
| 7,689,332 B2 | 3/2010 | Yakes et al. | |
| 7,711,460 B2 | 5/2010 | Yakes et al. | |
| 7,715,962 B2 | 5/2010 | Rowe et al. | |
| 7,725,225 B2 | 5/2010 | Pillar et al. | |
| 7,729,831 B2 | 6/2010 | Pillar | |
| 7,739,921 B1 | 6/2010 | Babcock | |
| 7,756,621 B2 | 7/2010 | Pillar et al. | |
| 7,784,554 B2 | 8/2010 | Grady et al. | |
| 7,792,618 B2 | 9/2010 | Quigley et al. | |
| 7,831,363 B2 | 11/2010 | Quigley | |
| 7,835,838 B2 | 11/2010 | Pillar et al. | |
| 7,848,857 B2 | 12/2010 | Nasr et al. | |
| 7,874,373 B2 | 1/2011 | Morrow et al. | |
| 7,878,703 B2 | 2/2011 | Roberts | |
| 7,889,187 B2 | 2/2011 | Freier et al. | |
| 7,954,508 B2 | 6/2011 | Doyle et al. | |
| 7,987,916 B2 | 8/2011 | Laskaris et al. | |
| 7,997,348 B2 | 8/2011 | Hosfield | |
| 8,000,850 B2 | 8/2011 | Nasr et al. | |
| 8,095,247 B2 | 1/2012 | Pillar et al. | |
| 8,162,619 B2 | 4/2012 | Laskaris | |
| 8,245,790 B2 | 8/2012 | Lozier | |
| 2001/0013555 A1 | 8/2001 | Egashira et al. | |
| 2003/0130765 A1 | 7/2003 | Pillar et al. | |
| 2003/0158635 A1 | 8/2003 | Pillar et al. | |
| 2003/0195680 A1 | 10/2003 | Pillar | |
| 2004/0065450 A1 | 4/2004 | Yoshida | |
| 2004/0133319 A1 | 7/2004 | Pillar et al. | |
| 2005/0077057 A1 | 4/2005 | Laskaris | |
| 2005/0113996 A1 | 5/2005 | Pillar et al. | |
| 2005/0222287 A1 | 10/2005 | Roberts | |
| 2006/0131038 A1 | 6/2006 | Lichtig | |
| 2006/0180321 A1 | 8/2006 | Yoshida | |
| 2006/0243324 A1 | 11/2006 | Klein et al. | |
| 2007/0061054 A1 | 3/2007 | Rowe et al. | |
| 2007/0164127 A1 | 7/2007 | Lozier et al. | |
| 2007/0261509 A1 | 11/2007 | Meyer et al. | |
| 2008/0035201 A1 | 2/2008 | Roberts | |
| 2008/0041599 A1 | 2/2008 | Mulkey et al. | |
| 2008/0059030 A1 | 3/2008 | Quigley et al. | |
| 2008/0103651 A1 | 5/2008 | Pillar et al. | |
| 2008/0215190 A1 | 9/2008 | Pillar et al. | |
| 2008/0215700 A1 | 9/2008 | Pillar et al. | |
| 2008/0221741 A1 | 9/2008 | Pillar et al. | |
| 2008/0292472 A1 | 11/2008 | Laskaris | |
| 2009/0218110 A1 | 9/2009 | Laskaris et al. | |
| 2009/0260836 A1 | 10/2009 | Laskaris et al. | |
| 2009/0277656 A1 | 11/2009 | Combs | |
| 2010/0012332 A1 | 1/2010 | Fisher et al. | |
| 2010/0012333 A1 | 1/2010 | Fisher et al. | |
| 2010/0065286 A1 | 3/2010 | Hosfield | |
| 2010/0274397 A1 | 10/2010 | Lozier et al. | |
| 2010/0301668 A1 | 12/2010 | Yakes et al. | |
| 2010/0319479 A1 | 12/2010 | Sjolin et al. | |
| 2011/0064591 A1 | 3/2011 | McLoughlin et al. | |
| 2011/0127051 A1 | 6/2011 | Guse | |
| 2011/0174383 A1 | 7/2011 | Combs | |
| 2011/0200461 A1 | 8/2011 | Christensen et al. | |
| 2011/0240317 A1 | 10/2011 | Laskaris et al. | |
| 2012/0012344 A1 | 1/2012 | McLoughlin et al. | |
| 2012/0061108 A1 | 3/2012 | Cerrano | |

FOREIGN PATENT DOCUMENTS

| | | |
|---|---|---|
| WO | WO03/055714 A1 | 7/2003 |
| WO | WO03/059455 A2 | 7/2003 |
| WO | WO03/060831 A2 | 7/2003 |
| WO | WO03/061235 A2 | 7/2003 |
| WO | WO2004/052756 A1 | 6/2004 |
| WO | WO2004/102105 A1 | 11/2004 |
| WO | WO2005/011943 A2 | 2/2005 |
| WO | WO2005/021099 A2 | 3/2005 |
| WO | WO2005/039936 A2 | 5/2005 |

(56) References Cited

FOREIGN PATENT DOCUMENTS

| WO | WO2005/100463 | A2 | 10/2005 |
|---|---|---|---|
| WO | WO2006/037100 | A1 | 4/2006 |
| WO | WO2006/052792 | A2 | 5/2006 |
| WO | WO2006/118777 | A2 | 11/2006 |
| WO | WO2007/140179 | A2 | 12/2007 |
| WO | WO2008/002963 | A2 | 1/2008 |
| WO | WO2008/021918 | A2 | 2/2008 |
| WO | WO2009/002799 | A2 | 12/2008 |
| WO | WO2009/108395 | A1 | 9/2009 |
| WO | WO2010/148162 | A2 | 12/2010 |
| WO | WO2012/033920 | A1 | 3/2012 |

OTHER PUBLICATIONS

Extended European search report dated Sep. 19, 2011 from related European patent application No. 08781957.9.
STNews Staff Writers, New Monitor Position Indicator Safely Aims Water Stream at Fire, Security Technology News, dated Feb. 2006, http://www.stnews.com/_fire_rescue_&_safety/articles/177480000/ new_monitor_position_indicator_safely_aims_water_stream_at_fire.html. accessed Mar. 27, 2012.
Webpage: STNews.com, New Monitor Position Indicator Safely Aims Water Stream At Fire, accessed Mar. 16, 2012.
News Release, United States: Fire Department Gets New Truck, KCHW Newswire, Aug. 21, 2010, Euclid Infotech Private Ltd.
Webpage: KZ Valve.com, Motorized Valves and Controls, accessed Mar. 26, 2012.
Akron Brass—Full Line Catalog, Weldon—Akron Brass, undated.
Hale Products, Class 1 Pump Modules, 2010 Hale Products.
Hale Safe Buy Brochure, Hale Products, undated.
Webpage: Fire Apparatus, Monitors Becoming More Efficient, Easier to Control, Fire Apparatus Magazine, accessed Apr. 9, 2012.
Webpage: Hale, www.haleproducts.com, accessed Mar. 26, 2012.
European Patent Application No. 08781957.9, Communication pursuant to Article 94(3) EPC, Sep. 11, 2013, (6 pages).

\* cited by examiner

FIREFIGHTING DEVICE FEEDBACK CONTROL

CROSS REFERENCE TO RELATED APPLICATIONS

This application is a continuation of application Ser. No. 12/174,866, entitled FIREFIGHTING DEVICE FEEDBACK CONTROL, filed Jul. 17, 2008, which claims the benefit of provisional application Ser. No. 60/950,137, entitled MONITOR FEEDBACK CONTROL filed Jul. 17, 2007, the disclosures of which are herein expressly incorporated by reference in their entirety

TECHNICAL FIELD AND BACKGROUND OF THE INVENTION

The present invention relates to fire fighting equipment and, more specifically, to the control of the position and orientation of fire fighting equipment, including monitors, valves, extenders, or the like, and to control the relative position of the firefighting equipment to other components, including for example ladders, lights or the like on a fire truck.

Traditional monitors use hard mechanical stops or programmable soft stops to control the minimum/maximum ranges of travel. However, the limits only affect a single axis of motion and only provide two points of control—maximum travel in either direction.

However, none of these systems provide for a means to have "infinite" control of the monitor travel and/or its limits of travel. At best, current systems are used to provide end stops for a single axis of movement or provide discretely variable end stops for a single axis of movement.

When the control over the monitor position and orientation is improved the ability to fight a fire and the safety of its responders are enhanced.

Accordingly, there is a need to provide even greater control over a monitor's position and orientation.

SUMMARY OF THE INVENTION

Accordingly, the present invention provides a control system that offers enhanced control over the position and orientation, including relative position and orientation, of a fire fighting device or component and enhanced information about the position and orientation of the fire fighting device or component.

In one form of the invention, a control system for a fire fighting component includes a detector for detecting a position of at least a portion of the fire fighting component relative to an axis, a controller in communication with the detector, and a display. The detector generates one or more output position signals indicative of the position of the at least a portion of the fire fighting component. The controller receives the output position signal and generates a display output position signal based on the output position signal. The display is in communication with the controller and receives the display output signal and, further, generates an icon, which is a graphical representation of the fire fighting device. In addition, the display configures the icon based on the output display signal wherein the configuration of the icon indicates the position of the fire fighting device or portion thereof.

In one aspect, the control system is in combination with the fire fighting device. For example, the fire fighting device may comprise a fluid delivery device, such as a monitor and/or a nozzle.

In a further aspect, when used in connection with a monitor, the monitor typically is rotatable about a base, with the detector generating an output position signal indicative of the rotational position of the monitor about the base.

In another aspect, the monitor includes an outlet, which is rotatable about an axis. The detector generates an output position signal indicative of the rotational position of the outlet about the axis.

When used in connection with a nozzle, the detector may output a signal indicative of the position or orientation or the nozzle, including the position of the nozzle tip so that the amount or type of flow from the monitor can be controlled.

According to yet a further another aspect, the fire fighting device comprises a monitor with an adjustable nozzle that has an extendible nozzle body that is extendible along a nozzle axis. The detector may be configured to generate an output position signal that is indicative of the linear position of the nozzle body relative to the nozzle axis.

In yet another aspect, the icon includes a first icon portion and a second icon portion, with the second icon portion being movable with respect to the first icon portion, and the second icon portion indicating the angular position of the nozzle body.

In another form of the invention, a control system for a fire fighting component includes a detector for detecting a position of at least a portion of the fire fighting component relative to an axis and a controller which is in communication with the detector. The detector generates at least one output position signals indicative of the position of the at least a portion of the fire fighting component, which is received by the controller. The system further includes an input device that is operative to generate an input position signal to the controller, which adjusts the position of the at least a portion of the fire fighting component in response to the input position signal based on the output position signal of the detector.

In one aspect, the control system is in combination with the fire fighting device. For example, the fire fighting device may comprise a fluid delivery device, such as a monitor. In a further aspect, the monitor is rotatable about the base, with the detector generating an output position signal indicative of the rotational position of the monitor about the base.

In another aspect, the monitor includes an outlet, which is rotatable about an axis, with the detector generating an output position signal indicative of the rotational position of the outlet about the axis.

In yet another aspect, the system includes a second detector. The monitor includes an outlet, which is rotatable about an axis, with the second detector generating an output position signal indicative of the rotational position of the outlet about the axis. The controller then adjusts the position of the monitor about the base and/or the outlet about the axis based on the input position signal and the output position signals of both detectors.

According to yet another aspect, the monitor includes an adjustable nozzle that has an extendible nozzle body that is extendible along a nozzle axis, with the detector detecting the position of the nozzle body relative to the nozzle axis. Further, the controller adjusts the position of the nozzle body in response to the input position signal based on the output position signal of the detector.

In a further aspect, the system also may include a display in communication with the controller, which generates a display output signal based on the output position signal from the detector. The display generates an icon based on the display output signal, which is a graphical representation of the monitor. Further, the display configures the icon based on the output display signal wherein the configuration of the icon indicates the position of the monitor. For example, the icon may include a first icon portion and a second icon portion, the second icon portion being movable with respect to the first icon portion to indicate the angular position of the monitor.

According to yet another form of the invention, a method of controlling the position of a fire fighting device includes detecting the position of the fire fighting device, generating an output position signal based on detecting the position, generating an input position signal, and adjusting the position of the fire fighting device based on the input position signal and the output position signal.

In aspect, detecting the position of the fire fighting device includes detecting the position of the fire fighting device with respect to two axes. In this form, an output position signal is generated for each axis, and the position of the fire fighting device is adjusted relative to at least one of the axes based on the input position signal and the output position signals.

In yet another form of the invention, a method of indicating the position of a fire fighting device includes detecting the position of the fire fighting device, generating an output position signal based on the detecting, and generating an icon based on the output position signal. The icon is configured as a geometrical representation of the fire fighting device, with the configuration of the icon changing to indicate the position of the fire fighting device based on the input position signal.

In one aspect, the position of the fire fighting device is detected with respect to two axes, and an icon is generating for each axis.

Accordingly, the present invention provides a control system that offers enhanced control over the position and orientation of a fire fighting device or component and enhanced information about the position and orientation of the fire fighting device or component.

These and other objects, advantages, purposes, and features of the invention will become more apparent from the study of the following description taken in conjunction with the drawings.

DETAILED DESCRIPTION OF THE PREFERRED EMBODIMENT

Figure 1:
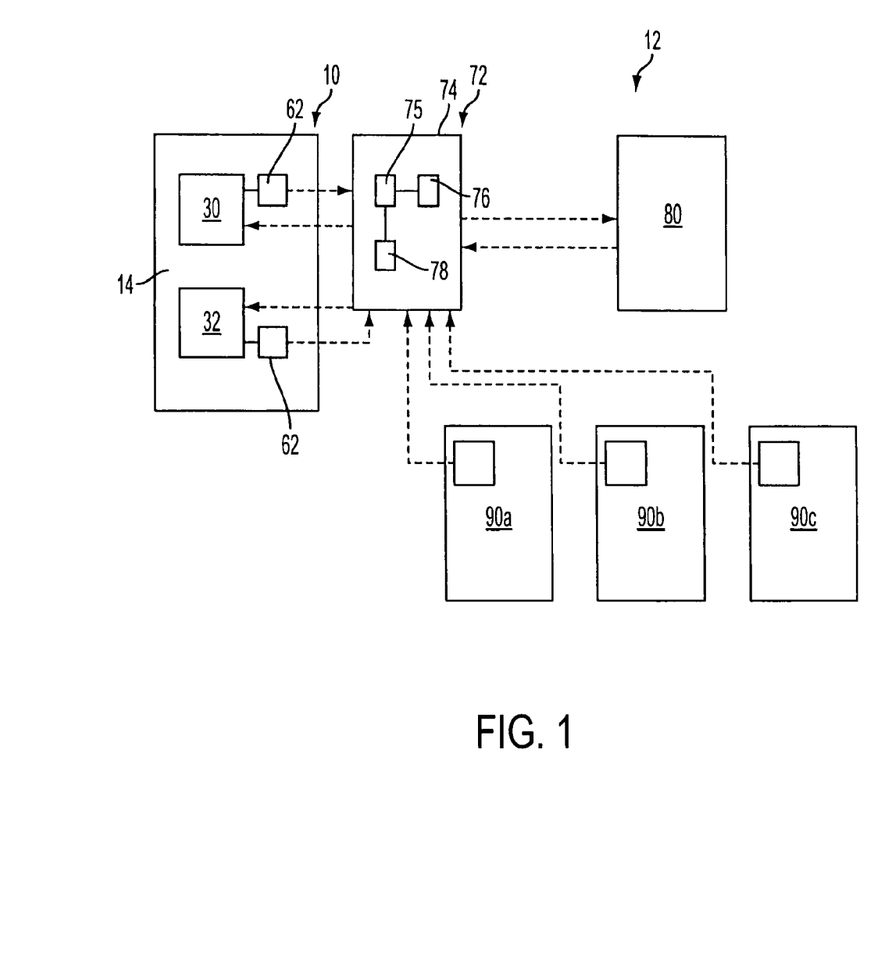
FIG. 1 is a schematic drawing of the fire fighting device and control system of the present invention.

Referring to FIG. 1, the numeral 10 generally designates a fire fighting device or component that is controlled by a control system 12 of the present invention. As will be more fully described below, control system 12 comprises a closed loop feedback system that can detect the position of the fire fighting device and reposition the fire fighting device to essentially in an infinite number of positions and, further, displays the fire fighting device in the essentially infinite number of positions in a clear and easily interpreted manner to provide position information to a user, such as a fire fighter to enhance the control over the fire fighting device. Although the foregoing description is made to the fire fighting device in the form of a fluid delivery device and, more specifically, to a monitor 14, it should be understood that the control system of the present invention may be used in conjunction with other devices, including valves, deck gun elevators, ladders or the like.

Figure 2:
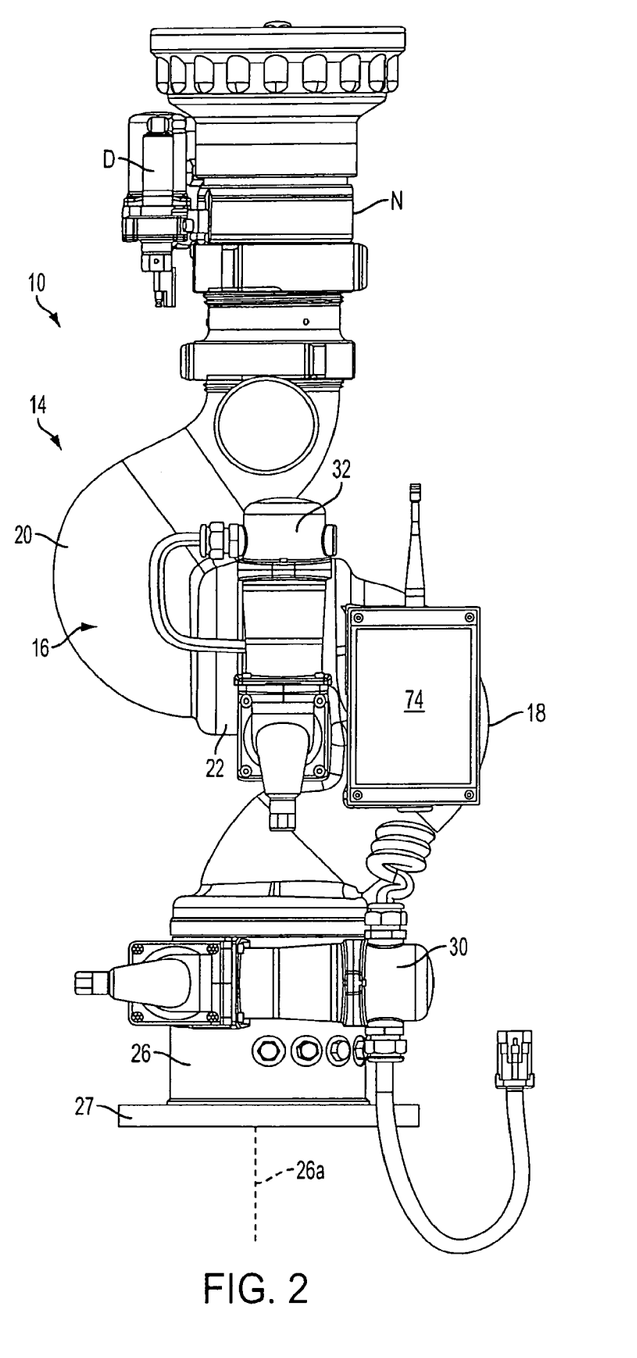
FIG. 2 is an elevation of one embodiment of the fire fighting device of the present invention.
Figure 3:
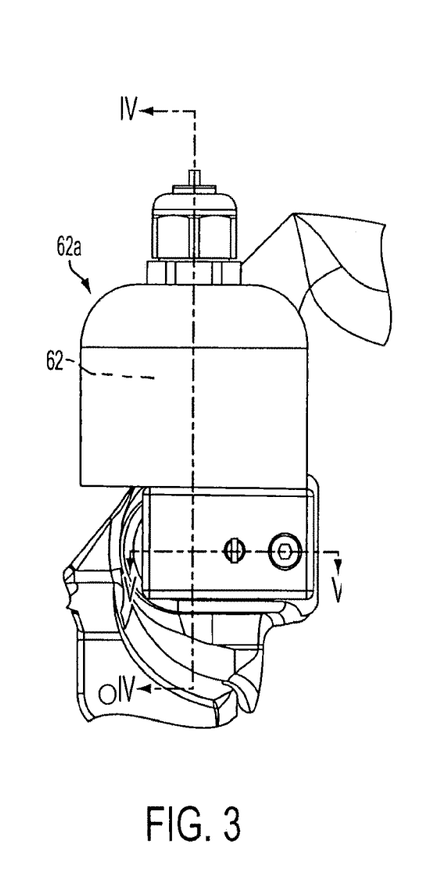
FIG. 3 is an enlarged view of one embodiment of a detector of the control system.
Figure 6:
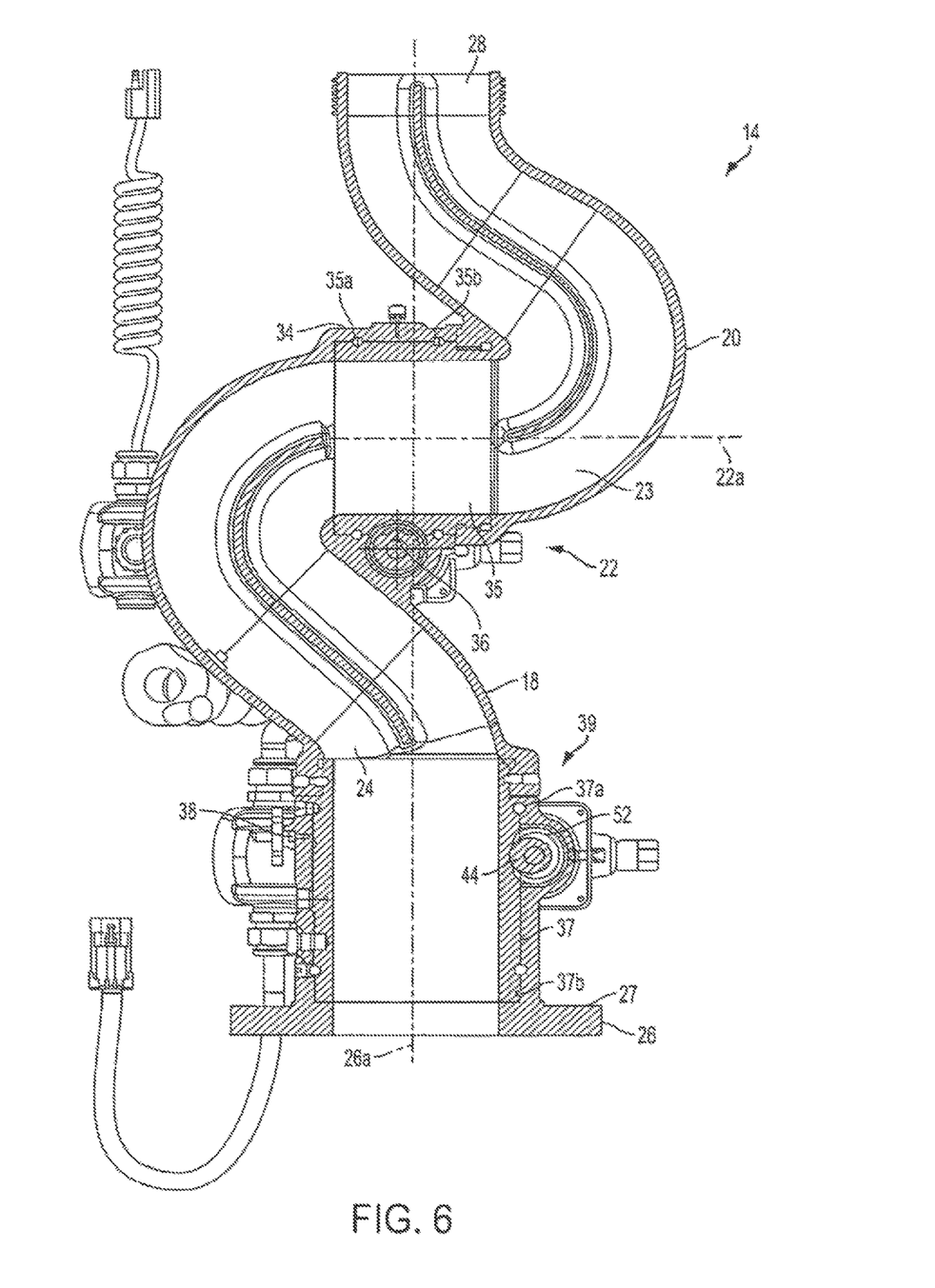
FIG. 6 is cross-section view taken through the monitor of FIG. 2 with the detector removed.
Figure 7:
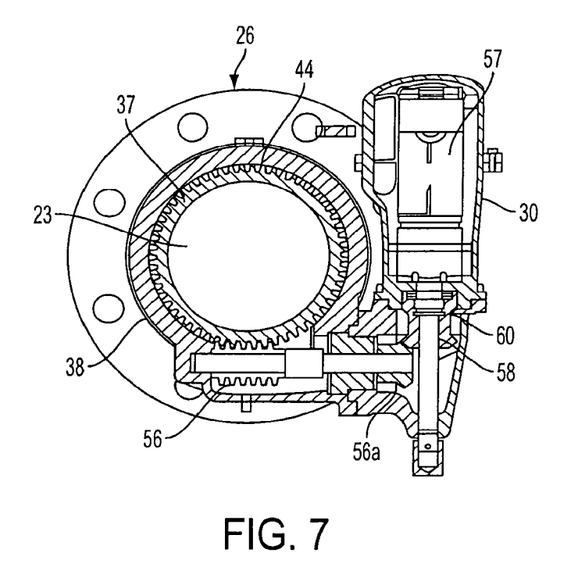
FIG. 7 is a cross-section view taken through the base of the monitor of FIG. 2 with the detector removed.

Referring to FIGS. 2 and 6, monitor 14 includes a housing 16 formed from two or more pipe sections 18, 20 that are interconnected using a conventional sealed pivot joint 22 to form a fluid passageway 23 therethrough. Pipe section 18 comprises a generally U-shaped pipe section, and pipe section 20 similarly comprises a generally U-shaped pipe section so that the passageway formed through housing has a generally S-shaped path. It should be understood that the present invention is also applicable to monitors with different configurations and to other fire fighting components.

In the illustrated embodiment, pipe section 18 forms an inlet 24 and is rotatably mounted to a base 26 about a first axis 26a. Base 26 includes a flange 27 that is adapted for mounting to a fire truck to provide a fixed base, which provides a point of rotation for housing 16 about axis 26a and further allows housing 16 to be rotated up to and through a 360 degree arc and multiples thereof. Pipe section 20 forms an outlet 28, which is adapted for mounting a nozzle, such as a fixed nozzle or an adjustable nozzle, to the monitor, so that when pipe section 18 is rotated in base 26, outlet 28 (and the nozzle mounted thereto) can pan through a horizontal plane through an infinite number of angles between 0 degrees and 360 degrees (and multiples thereof). An illustrative example of a nozzle N is depicted in FIG. 2. Other types of nozzles can, of course, be used.

As noted above, housing 16 is formed from two or more pipe sections 18 and 20 that are interconnected by pivot joint 22, which allows outlet 28 to be pivoted about pivot axis 22a and thereby raised or lowered relative to the base. To rotate housing 16 in base 26 and raise or lower outlet 28, monitor 14 is provided with a drive mechanism 30, 32 for each respective pivot axis so that pipe section 18 can be rotated in base 26 independent of the rotation of pipe section 20 relative to pipe section 18. In addition, where an adjustable nozzle is mounted to outlet pipe section 26, monitor 10 may incorporate a drive mechanism or actuator to adjust the shape of the stream.

Pivot joint 22 is formed by enlarged collar 34, which is formed at the outlet end of pipe section 18, and a pipe section 35 that is coupled to the inlet end of pipe 20 and which includes bearings 35a and 35b (FIG. 6) that ride on grooves formed in the outlet end of pipe section 18. Further, pipe section 35 includes a plurality of gear teeth 36, which extend around at least a portion of the circumference of pipe section 35 and which are driven by drive mechanism 32, described in more detail below. Similarly, pipe section 18 includes a pipe section 37 that is coupled to the inlet end of pipe 18, which extends into upstanding pipe section 38 and includes a plurality of bearings 37a and 37b that ride on grooves formed in the upstanding pipe section 38. In addition, pipe section 37 includes a plurality of gear teeth 44, which extend around the full circumference of pipe section 37, and are driven by drive mechanism 30. In this manner, gear teeth 44 allow for a full 360° rotation or greater of monitor 14 on base 26. Though it should be understood that the gear teeth may provided only over a portion of the pipe section circumference.

As best seen in FIG. 6, gear teeth 44 of pipe section 37 are aligned with an opening 52 formed in pipe section 38 of base 26 so that teeth 44 are accessible through opening 52 to be driven by drive mechanism 30. Drive mechanism 30 is mounted to base 26 and includes a worm gear 56 that is aligned with opening 52 and meshes with gear teeth 44. Drive mechanism 30 includes a motor 57, a drive shaft 58 with a drive gear 60, which drives worm a driven gear 56a on worm gear 56. In this manner, when worm gear 56 of drive mechanism 30 is rotated, pipe section 18 will rotate about pivot axis 26a.

Drive mechanism 32 is of similar construction to drive mechanism 30 and includes a worm gear 56, a motor 57, a drive shaft 58, and a drive gear 60 that drives worm gear 56. Drive mechanism 32 is mounted to pipe section 18 at collar 34 and further aligned with gear teeth 36, with its worm gear 56 meshing with teeth 36 through an opening provided in collar 34. In this manner, when gear 56 of drive mechanism 32 is rotated, pipe section 20 will rotate about pivot axis 22a.

Further, where an adjustable nozzle is mounted to monitor 14 at outlet 28, a third drive mechanism may be provided to move the nozzle body to vary the stream flowing from the nozzle. For example, when moved, the nozzle body will vary the configuration of the stream between a straight stream flow or a wide or "fog" flow. Similarly, a detector may be mounted to the drive shaft of the nozzle drive mechanism, which will provide direct feed back to the controller of the configuration of the nozzle. As noted above, the position of monitor 14 (and optionally the configuration of the nozzle) is controlled by control system 12. In the illustrated embodiment, control system 12 includes a plurality of detectors 62, each associated with a drive mechanism (30, 32, and a drive mechanism D for the nozzle). In the illustrated embodiment, detectors 62 comprise position transducers, such a rotary potentiometers, which detect the rotary position of the respective worm gears 56 of the drive mechanisms (30, 32 or nozzle drive mechanism D), which can be used as a direct measure of the angular position of pipe section 18 around axis 26a and the angular position of pipe section 20 around axis 22a (and optionally the linear position of the nozzle body along the nozzle axis). The detectors may have a signal read head and generate a signal data signal or multiple read heads, which generate more than one data signal. When using multiple (binary or tertiary etc) signals, one signal may be used for redundancy, for example as "back-up" signal, or may used to provide additional information. For example, one signal may have a different ramp rate (i.e. the amount of change in the feedback signal level as a function of one revolution) or non-linear feedback ramp rates, for example in programmable position devices. This may provide the opportunity to implement "fine" control in one area and "coarse" control in another area of the travel zone. Further, a signal may be used as a "switch". For example, a programmed feedback value can trigger a switch signal. This could eliminate the need for additional sensors, for example, hall sensors, and instead all the sensing associated with the monitored component to be combined into one positioning device.

Figure 4:
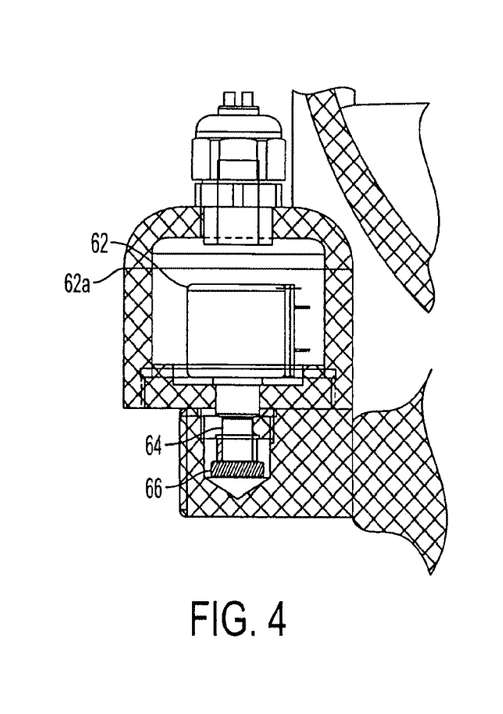
FIG. 4 is a cross-section taken along line IV-IV of FIG. 3.
Figure 5:
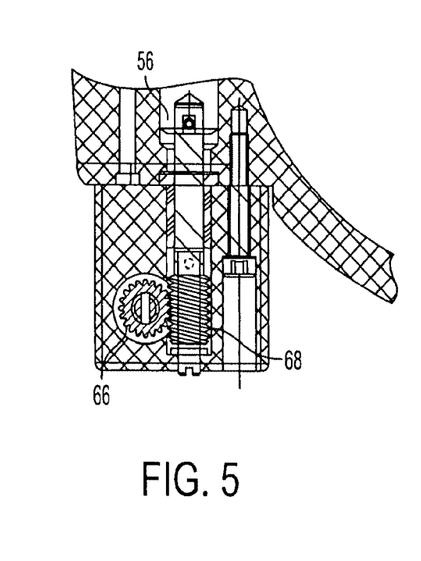
FIG. 5 is a cross-section taken along line V-V of FIG. 3.

Referring to FIGS. 4-5, each detector 62 is mounted adjacent the terminal end of the respective worm gear (56). In the illustrated embodiment detector 62 includes a housing 62a and a rotary shaft 64 with a gear 66 that meshes with a worm gear 68 that is coupled to the end of the worm 56 of the respective drive mechanism. It should be understood that as noted above other types of detectors may be used, including for example detectors that measure a change in resistance, voltage, current, inductance, capacitance, including hall effect sensors. Further, light sensors may be used, including infrared light or ultraviolet light sensors, which use light to measure a change in position via a pulsing of the light source passed through a component coupled to the moving axis or light source reflected from a component coupled to the moving axis.

Control system 12 also includes a control module 72 that is mounted to a circuit board and located in a housing 74 (FIG. 2), which in turn is mounted to monitor 14, for example, by a bracket. For an example of RF control of the respective drive mechanisms, reference is made to copending application U.S. patent application, entitled FIRE-FIGHTING MONITOR WITH REMOTE CONTROL, Ser. No. 10/984,047, filed Nov. 9, 2004, which is incorporated by reference herein in its entirety. Control system 12 also includes an input device 76, such as a key pad, buttons or a remote control device, which is used to generate input position signals to the control module to select the desired position and/or orientation of the monitor and optionally the configuration of the nozzle, as noted above. Control module 72 is in communication with detectors 62 and receives output position signals from detectors 62 that are indicative of the position of the monitor about axis 26a and of outlet 28 about axis 22a (and optionally nozzle body position along the nozzle axis). As noted above, each detector 62 may generate one or more signals. Further control module 72 is in communication with a power source, for example an onboard power source noted below or an external power source, to selectively drive the respective drive mechanisms.

Referring to again to FIG. 1, control module 72 includes a controller 75, such as a microprocessor, drive circuitry for driving the drive mechanisms, and optionally a receiver so that a remote input device may be used to control the position or orientation of the monitor. As noted above, housing 74 also optionally houses a power source 78, including a rechargeable battery, which powers control module 72 to the drive mechanisms so that monitor 14 may comprise a stand alone unit. Alternately, the controller as well as the drive mechanisms may be powered from an external power supply through electrical wiring or cables. Further, control system 12 includes a display 80 to display position information, which is more fully described below.

Using the output position signals from detectors 62, control system 12 monitors the position of the monitor 10 (as well as outlet 28 and/or nozzle) and further adjusts the position of the monitor about axis 26a and/or the position of outlet about axis 22a by driving one or more of the drive mechanisms in response to input position signals from the input device 76 to thereby form a closed feedback loop control system. Thus, control module 72 provides infinite control over the monitor axis of travel and may control all axes simultaneously to provide coordinated control over the monitor axes, as well as the configuration of the nozzle. Further, control module 72 may incorporate a memory storage device for storing data and also software which may provide programmed control over the position of the monitor of each axis of travel and optionally the position of the nozzle body. For example, control module 72 may incorporate a program that provides pre-programmed multi-axis oscillation, for example, horizontal vertical and/or nozzle oscillation.

Further, control module 72 may be in communication with other devices 90*a*, 90*b*, and 90*c* (FIG. 1) or other controllers on the truck to coordinate the movement of the monitor with other fire fighting devices or components on the truck. For example, control logic can be expanded to provide for targeted movement of the monitor in coordination with other devices. If a ladder needs to be repositioned, it is possible that the operator could enter a "range to target" at which point the programmable logic could read the ladder movements and keep the monitor on target during the repositioning. Similarly, the display may incorporate icons for the other devices. For example, valves, a ladder, etc can be programmed to be displayed visually as well. If incorporated with a touch screen or touch key control device—operation of the truck devices could be reduced to a very small package. For example, large pump panels could be reduced to a screen of less than a couple square feet.

Control module 72 may also have stored thereon a software program, such as a "safe zone" program, which maps the position of the monitor in 3D space and, further maps the position or status of other components on the truck, for example, a ladder, the truck cab, an extendible light, a valve, or the like. If the truck has a ladder, raised cab, or extendable light, for example, that is presently "in the possible path" of the monitor—hitting either item while water is flowing could generate significant damage to the truck, ladder, cab or light. For example, monitor axis of travel could be stopped when it reach an obstruction until the operator moves another monitor axis to eliminate the obstruction; monitor axis could be pre-programmed to "self clear" (i.e. as you move horizontally towards a truck light, the monitor has a ramp-up routine to raise itself and not hit). Further, signal lights or buzzers may be incorporated into control system 12 to indicate obstruction or obstruction approach. Additionally, valves may be controlled such that valves can not be opened if the monitor is at an obstruction. In this scenario, obstructions may be programmed on or off depending on the water flow condition.

Where monitor 10 comprises an extended travel monitor, for example that is mounted on the lower side of a ladder that has a fly extension. When the fly extension is retracted, the monitor has greater upward vertical travel. When the fly extension is extended, control system 12 may be configure to limit the monitor vertical travel so it can not raise up and hit the fly extension. It should be understood that many other scenarios may be programmed into the control module, and the listed scenarios are exemplary only.

In addition to actuating the drive mechanisms (and actuator) and detecting the position of the monitor and outlet (and optionally nozzle body) based on the output signals from detectors 62, control system 12 is configured to display the position of the monitor relative to the base and the position of the outlet (and nozzle) relative to pipe section 18. As noted above, control module 72 receives signals from detectors 62, which may be analog or digital signals, and processes the output position signals from detectors 62 and generates output display signals for a display 80, which is configured to display the position of the monitor both relative to the vertical axis and the horizontal axis based on the output display signals output from control module 72.

In the illustrated embodiment, detectors 62 comprise potentiometers and output analog signals, in which case control module 72 optionally includes an analog to digital (A/D) converter to convert the detectors' analog signals into digital signals, which are then processed as the output display signals. In this manner, control system 12 comprises a closed loop feedback system that can accurately detect and control the position of the monitor, its outlet and nozzle and further display the position of the monitor, outlet and nozzle over its full range of motion. Additionally, as noted above, by providing enhanced control over the position of the monitor and its outlet and nozzle, control system 12 may use input from other sources, such as positional information relative to other components on the truck, to minimize the risk of interaction with monitor and other devices on the truck.

Figure 8A:
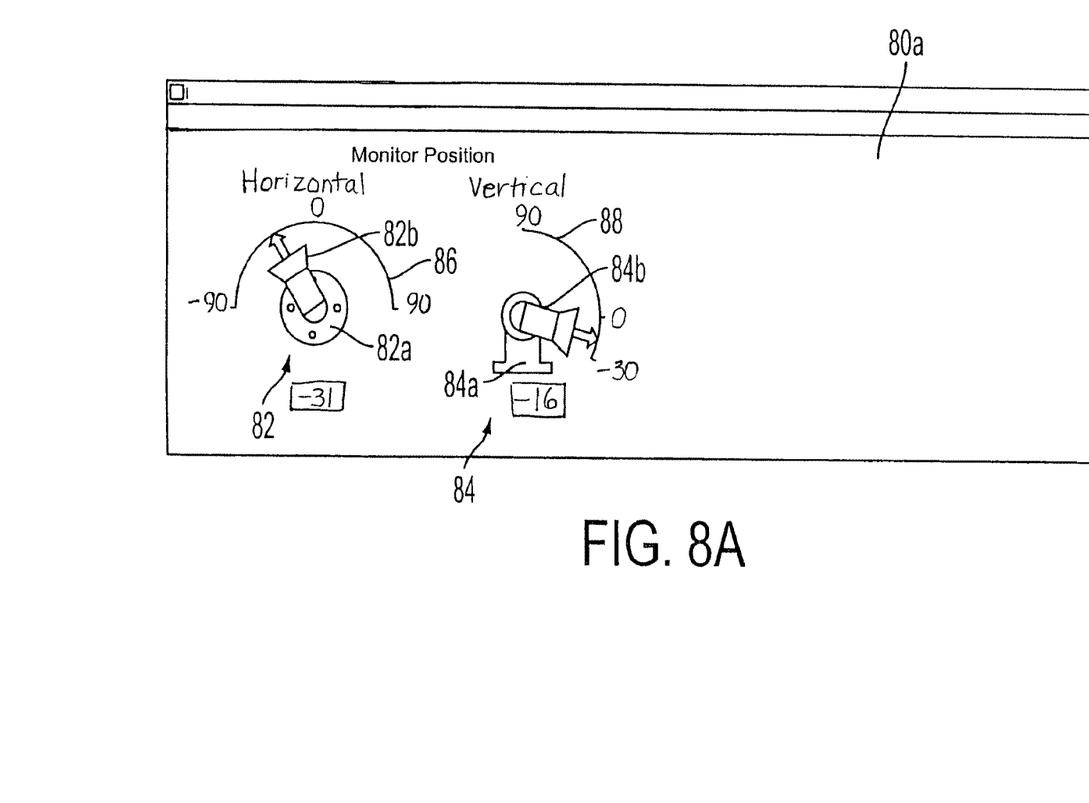
FIGS. 8A-8C illustrates a first embodiment of a display with icons and angular position scales to illustrate several positions of the monitor and monitor outlet.
Figure 8B:
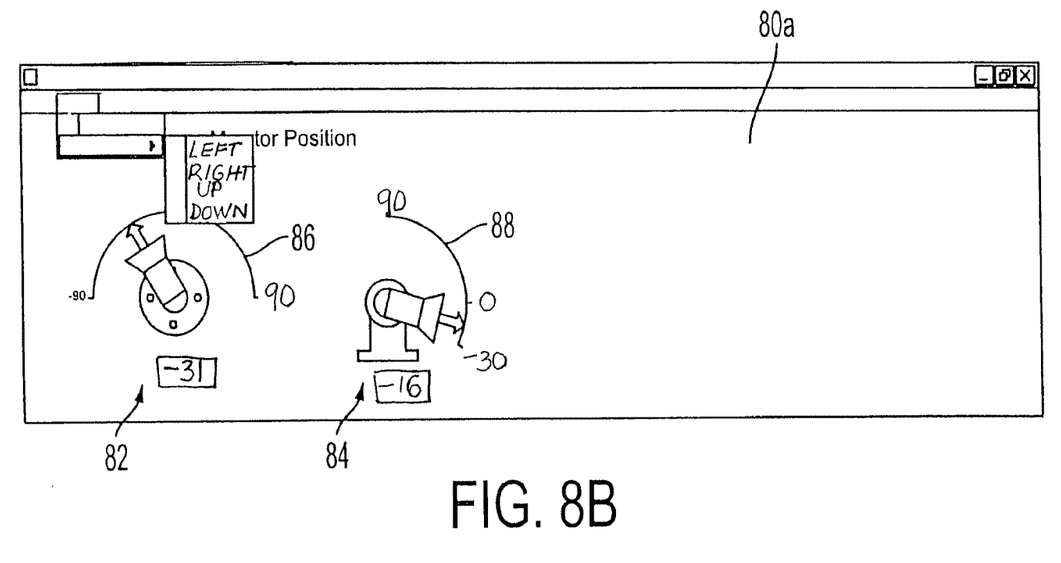
Figure 8C:
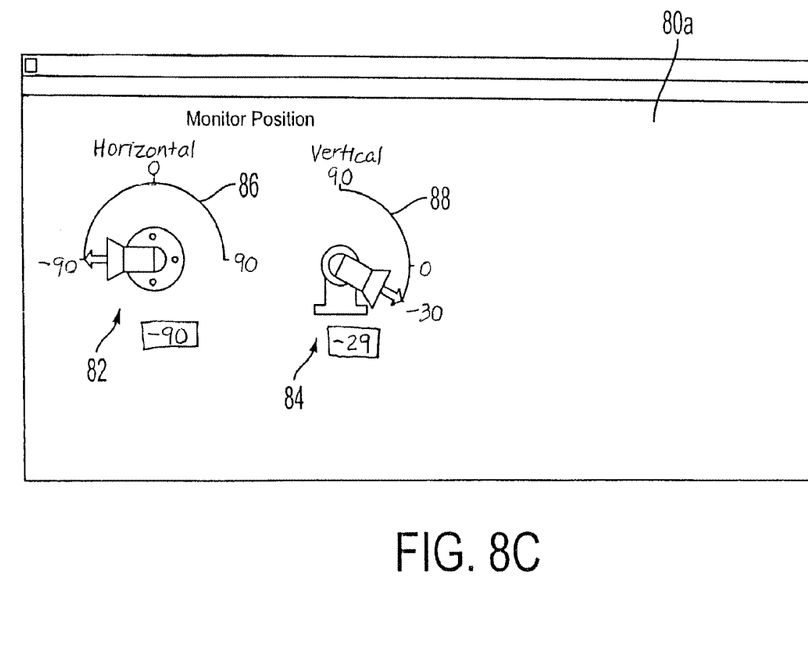

Referring to FIG. 8A-8C, display 80 may comprise a display monitor, including a display monitor on a laptop computer. In the illustrated embodiment, display 80 includes a screen 80*a* with a plurality of icons 82 and 84, which may comprise graphical representations of the fire fighting device, for example monitor 10, from several views. In the illustrated embodiment icon 82 comprises a graphical representation of monitor 10 from a plan view and includes a first icon portion 82*a* that is representative of the base 26 and a second icon portion 82*b* that is representative of the housing 16. Further, icon 82 is positioned adjacent an angular scale formed from an arcuate line 86 that provides an angular scale with an infinite number of angular positions and at least three points with angular values associate therewith.

Icon 84 similarly includes a first icon portion 84*a* that is representative of the base 26 and pipe section 18 and a second icon portion 84*b* that is representative of pipe section 20 (and nozzle mounted to outlet 28). Icon 84 is similarly is positioned adjacent an angular scale formed from an arcuate line 88 that provides an angular scale with an infinite number of angular positions and at least three points with angular values associate therewith.

As note above, control module 72 generates display output signals to display 82, which then adjusts the orientation of icons 82 and 84 based on the display output signals from control module 72. As noted above, display 80 may comprise a display of a laptop and, therefore, may include its own processor for processing the signals from controller 72. Alternately, as describe below, the display may simply comprise a companion monitor display and have a display driver rather than a central processor as in the case of a laptop.

In this manner, display 80 provides positional information for the monitor in a clear and easily interpreted manner for a user, such as a fire fighter, which may enhance the control over the fire fighting device. Optionally, screen 80*a* may comprise a touch screen with the icons being manipulatable by a user to form an input device to control module 72. For example, a user may simply touch icon portion 82*b* and drag the icon portion in an arcuate path to generate position input signals to module 72 to reposition the monitor about axis 26*a*. Similarly, icon portion 84*b* may be dragged to reposition outlet 28 of monitor 10 about axis 22*a*.

Figure 9:
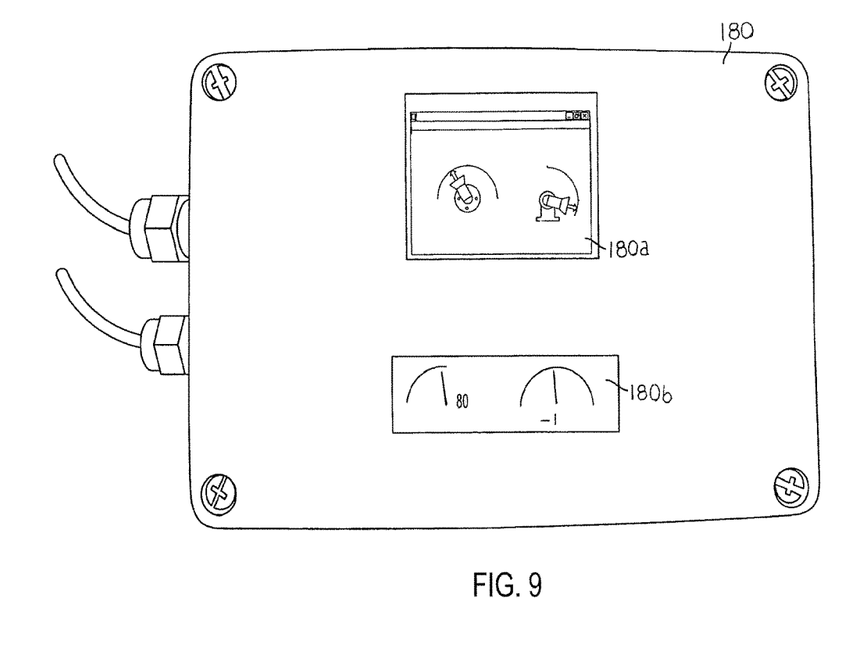
FIG. 9 illustrates another embodiment of a display with two screens with icons and angular position scales to illustrate several positions of the monitor and monitor outlet.

Referring to FIG. 9, the numeral 180 designates another embodiment of a display. In the illustrated embodiment display 180 is housed in an enclosure, for example, aluminum housing, which may be portable. Display 180 includes two screens 180*a* and 180*b*, with screen 180*a* being provided, for example, on a Windows Mobile 5 based Companion Display, such as HP IPAQ, which is configured in a similar manner as screen 80*a* with multiple ions, each with an icon portion to represent the movable portion of the monitor and each with an scale with an infinite number of angular positions to show the angular orientation of the movable portion of the monitor. Screen 180*b* is provided, for example, on a vacuum florescent display (VFD), and includes arcuate scale 186 and 188 similar to scales 86 and

88 of screen 80*a* but with a numerical read out of the actual position of the monitor and/or its outlet and nozzle. Thus display 180 provides numerical information relative to the position of the monitor and/or its outlet and nozzle, as well as graphical information.

As noted above, control module 72 receives signals from detectors 62 and further outputs signals to the displays. It should be understood that the signals may be transmitted using cables, including optical cables, or may be transmitted wirelessly through radio frequency transmission, though it should be understood that infrared transmission may also be used where the components are in close range and unlikely to experience interference. For example, a Bluetooth device may be used, as well as other RF transmitters or transceivers, to transmit the respective signals.

It will be understood from the foregoing description that the basic structure of the monitor can vary greatly, and in the illustrated embodiment comprises a monitor commercially available from Elkhart Brass under the trademark SCORPION. Further, as noted above, monitor 10 may include an adjustable nozzle. In which case, as noted above, the shape of the stream from the nozzle may be adjusted by a nozzle drive mechanism or actuator, such as the actuator available under part number 81185001 from Elkhart Brass Manufacturing Co., Inc. of Elkhart, Ind. Similar to drive mechanisms 30 and 32, the actuator may be remotely controlled by control system 12 so that the entire operation/control of monitor 10 can be controlled by control system 12. Although described primarily in reference to the operation of a monitor on a fire truck, the present system may be used to control other firefighting devices.

While several forms of the invention have been shown and described, other changes and modifications will be appreciated by those skilled in the relevant art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which exclusive property rights or privileges claimed are defined as follows:

1. Control system for a fire fighting device having a base and a first portion moveable relative to the base, said control system comprising:
    a touch screen display;
    a controller in communication with the touch screen display, said controller generating a manipulatable input icon to be displayed on the touch screen display, the manipulatable input icon being a graphical representation of the first portion of the fire fighting device, said controller generating a first input position signal in response to a manipulation of the manipulatable input icon;
    said controller adjusting a position of the first portion of the fire fighting device relative to the base in response to said input position signal.

2. The control system of claim 1, further comprising:
    a first detector in communication with said controller, said first detector generating an output position signal indicative of the position of the first portion of the fire fighting device relative to the base; said controller generating a first output display signal based on said output position signal, wherein a position display displays a position icon based on said output display signal, the configuration of said position icon indicating the position of the first portion of the fire fighting device.

3. The control system of claim 2, wherein the touch screen display includes the position display.

4. The control system of claim 2, wherein said fire fighting device is a monitor.

5. The control system of claim 2, further comprising:
    a second manipulatable input icon generated by the controller to be displayed on the touch screen display, the second manipulatable input icon being a graphical representation of a second portion of the fire fighting device, the second portion of the fire fighting device being moveable relative to the first portion of the fire fighting device, said controller generating a second input position signal in response to a manipulation of the second manipulatable input icon; said controller adjusting a position of the second portion of the fire fighting device relative to the first portion of the fire fighting device in response to said second input position signal.

6. The control system of claim 5, wherein touch screen display includes a single graphical representation of the fire fighting device comprising the first manipulatable input icon and the second manipulatable input icon.

7. The control system of claim 5, wherein the said adjusting a position of the first portion of the fire fighting device relative to the base includes rotating the first portion about a first axis, adjusting a position of the second portion of the firefighting device relative to the first portion of the fire fighting device includes rotating the second portion about a second axis, first axis being orthogonal to the second axis.

8. The control system of claim 5, wherein the manipulation of the first manipulatable input icon includes touching the icon and dragging the icon.

9. The control system of claim 5, wherein the manipulation of the first manipulatable input icon includes touching the icon and dragging the icon in an arcuate path.

10. The control system of claim 5, further comprising:
    a second detector in communication with said controller, said second detector generating an second output position signal indicative of the position of the second portion of the fire fighting device relative to the second axis; said controller generating a second output display signal based on said second output position signal; wherein a second position display displays a second position icon based on the second position output display signal, the configuration of said second position icon indicating the position of the second portion of the fire fighting device.

11. The control system of claim 10, wherein said first position icon and said second position icon are displayed on a single position display.

12. The control system of claim 11, wherein the touch screen display includes the single position display.

13. The control system of claim 10, wherein the fire fighting device is a monitor, the first portion of the monitor rotates about a fixed base, and the second portion of the monitor pivots about the first portion of the monitor.

14. The control system of claim 10, wherein the fire fighting device includes a continuous waterway between an inlet and an outlet.

15. The control system of claim 10, wherein the waterway follows a generally S-shaped path.

16. The control system of claim 11, wherein the adjustment of the first portion of the fire fighting device relative to the first axis includes rotating the first position about a base to adjust the orientation of the outlet through a horizontal plane relative to the base and the adjustment of the second portion of the fire fighting device relative to the second axis includes pivoting the second portion about the first portion to raise or lower the elevation of the outlet relative to the base.

17. The control system of claim 16, wherein the first portion can pan through the horizontal plane through an infinite number of angles between 0 degrees and 360 degrees.

18. The control system of claim 16, wherein the first portion of the fire fighting device includes a first generally U-shaped pipe section and the second portion of the fire fighting device includes a second generally U-shaped pipe section.

19. The control system of claim 16, wherein the first manipulatable icon is positioned adjacent a first angular scale displaying angular values associated with the angular scale, and manipulation of the first manipulatable icon relative to the first angular scale adjusts the orientation of the outlet through the horizontal plane at angles corresponding to the angular scale.

20. The control system of claim 19, wherein the second manipulatable icon is positioned adjacent a second angular scale displaying angular values associated with the second angular scale, and manipulation of the second manipulatable icon relative to the second angular scale adjusts the elevation of the outlet relative first portion of the fire fighting device at angles corresponding to the angular scale.

* * * * *